July 17, 1934.  G. T. SOUTHGATE  1,967,135
COMMUTATING METHOD AND DEVICE
Filed Nov. 30, 1931    5 Sheets-Sheet 1

Fig 1.

INVENTOR:
George T. Southgate,
BY  ATTORNEYS
Byrne Townsend & Potter.

July 17, 1934. G. T. SOUTHGATE 1,967,135
COMMUTATING METHOD AND DEVICE
Filed Nov. 30, 1931 5 Sheets-Sheet 2

INVENTOR:
George T. Southgate,
BY ATTORNEYS

July 17, 1934.  G. T. SOUTHGATE  1,967,135
COMMUTATING METHOD AND DEVICE
Filed Nov. 30, 1931   5 Sheets-Sheet 4

INVENTOR:
George T. Southgate,
BY ATTORNEYS
Byrne Townsend & Potter.

July 17, 1934.  G. T. SOUTHGATE  1,967,135
COMMUTATING METHOD AND DEVICE

Filed Nov. 30, 1931   5 Sheets-Sheet 5

INVENTOR:
George T. Southgate,
BY   ATTORNEYS

Patented July 17, 1934

1,967,135

UNITED STATES PATENT OFFICE 1,967,135

COMMUTATING METHOD AND DEVICE

George T. Southgate, Forest Hills Gardens, N. Y.

Application November 30, 1931, Serial No. 578,138

19 Claims. (Cl. 171—228)

The invention relates to electric commutation, more specifically referring to a new and improved method of commutation and a device for the practical application of this new method.

The operation known to the electrical art as "commutation", as distinguished from simple "rectification", comprises two important functions. One of these functions is to reverse sequentially the direction of connection of a series of current-carrying coils to external mains, and this function will hereinafter be referred to as the connection-reversing function. The other important function of commutation is to release the individual stored energy of self-induction of each coil during the earlier part, and to rebuild this energy with opposite-directioned currents during the latter part, of the commutative cycle. This second function will hereinafter be termed the energy-reversing function.

The energy-reversing function of commutation is usually effected in either or both of two ways. The first of these is through the familiar medium of carbon brushes which by the variations in contact area and resistance as they span the commutator bars of the successive coils help to effect this function. The second method is through the use of commutating interpoles and the like, which alternately unload and restore the self-inductive energy of each coil by induction between the coil and the interpole. The former method may be termed "resistance" commutation, while the latter method may be called "dynamic" commutation. As will appear hereinafter my invention may take advantage of either resistance or dynamic commutation.

The current-reversing function of commutation is commonly effected by rotating brushes or rotating commutator bars. These familiar arrangements involve numerous disadvantages inherent in rotary devices. For instance, frequently the frictional power losses are great, and frictional wear occurs to a troublesome extent. Possibly the greatest disadvantage of the present rotating commutating devices is the fact that they are inherently unsuited for the handling of high voltages; indeed, this fact has been one of the most important of the considerations militating against the development and use of high-voltage direct-current machinery.

The invention not only aims to overcome in a new commutative device the above disadvantageous characteristics of existing methods and devices; but also has for its objects other improvements, which will be developed and pointed out hereinbelow.

My invention involves in essence several novel concepts which comprise (1) the substitution of non-rotating contactors for the usual rotating brush and commutator structures, (2) the provision of tuning forks or their mechanical equivalents, upon which the contactors are mounted, for the purpose of effecting proper periodic closing of each contactor, (3) the provision of an electromagnet for each fork for the purpose of exciting and regulating the vibration of that fork, and (4) the provision of a system of control circuits for energizing each of said electromagnets periodically, whereby the vibratory and contacting mechanical system is coordinated with the electrical system which is to be commutated.

My invention may be more readily understood by referring to the drawings.

Figure 5 is taken in section along 5—5 of Figure 6.

Figure 1:
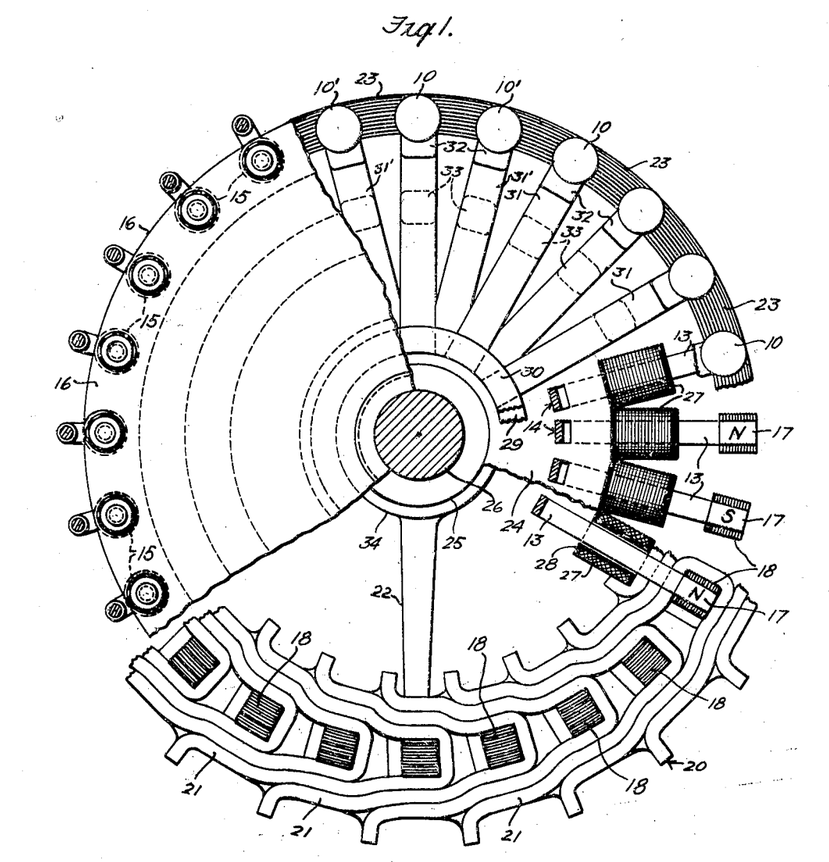
Figure 1 represents a view of a complete assembly in convenient circular arrangement of a series of commutative units. The arrangement shown is suitable for commutating a winding or armature having twenty-four coils, such as a 4-pole, 3-phase converter from alternating to direct current.

In the embodiment of my invention shown in Figures 1 to 4, a set of insulated contactors 15, stationarily mounted with their working faces substantially in one plane, are connected to the successive tap points of their winding in the manner usual for the connection of the segments of ordinary commutators to closed circuit armatures. The winding which the commutating device is to serve will hereinafter be called the armature, whether it be such in the ordinary sense of a generator or motor, or the primary or secondary winding of a transformer or converter. In a plane parallel to and near the plane mentioned above, are the working faces of another set of insulated contactors 10, mounted upon vibratory arms 12 and connected respectively to the positive and negative line mains 29 and 30, in coordination with the circuits 21 and cores 18 of the aforementioned control system 20 as follows: all of the odd-numbered members of this series of line contactors 10 are connected to the positive main 29, and the even-numbered members to the negative main 30. The control circuits 20, whose magnetisms cause the movement of the vibratory arms 12 and 13, are connected in the same sequence as that of the magnetic field around the armature 85. By means of the coils 27, excited with direct current, the vibrators 13 are magnetically polarized alternately north and south, as indicated in Figure 1. The result is that when a given odd-numbered vibratory line-member 10 is making contact, the next, even-numbered line contactor 10' is substantially at the maximum distance from contact in its cyclic swing, instead of being about to make contact.

In a two-pole machine, for example, one group of odd-numbered armature contactors 15 will be making contact through the odd-numbered line contactors 10 with the positive line 29, and a diametrically opposite group of even-numbered armature members 15 simultaneously will be making contact with the negative main 30, through the corresponding even-numbered line contactors 10'. In a four-pole machine there will be two groups, and in a six-pole machine three groups of armature contactors 15 of each numbered kind (odd and even respectively) in simultaneous contact with their corresponding line main. The span from one active armature contactor 15 to the next in the same active group will thus be across two armature coils or sections, and it is therefore desirable that the number of armature sections be reasonably large in order to reduce the commutated voltage per contactor span.

The purpose of this arrangement with alternately active and inactive contactors in a zone is to permit the use of single-active, single-faced line contactors 10, and to give a design somewhat easier with respect to mechanically tuning the vibratory members 13 to the frequency of the rotating field; it is particularly adapted to the use of tuning forks for the vibratory members. In the arrangement illustrated, the armature contactors 15 and the electromagnetic control structure 20 are well separated for convenient assembling, inspection and access.

A convenient and satisfactory arrangement for polarizing the forks is shown, comprising the provision of a direct-current winding system linked with the magnetically active prong 13 of each fork in such wise that the free end 17 of that prong 13 of an odd-numbered fork 14 is maintained as of north polarity; while the next, even-numbered fork 14 is similarly excited in the reverse sense so that its right-hand end 17 is of south polarity. Therefore when the flux in a core section 18 of the control system 20 corresponding to a given fork 14 is such as to cause maximum attraction of its magnetically active prong 13, that in the core section 18 opposite the next fork 14 is such as to cause quite or nearly maximum repulsion of the polarized prong 13. It will thus be seen that with this coordinated polarization the proper sequence of contacting occurs; since the normal vibration of a tuning fork is such that both tines move inwardly at the same time, and outwardly at the opposite portion of the cycle. The natural frequency of the mechanically vibratory system, including the fork 14 and its loading of a contactor 10 on one arm 12 and the magnetically active mass 17 on the other, 13, should preferably correspond closely to the frequency impressed upon the fork by the electromagnetic control system.

Figures 2, 3:
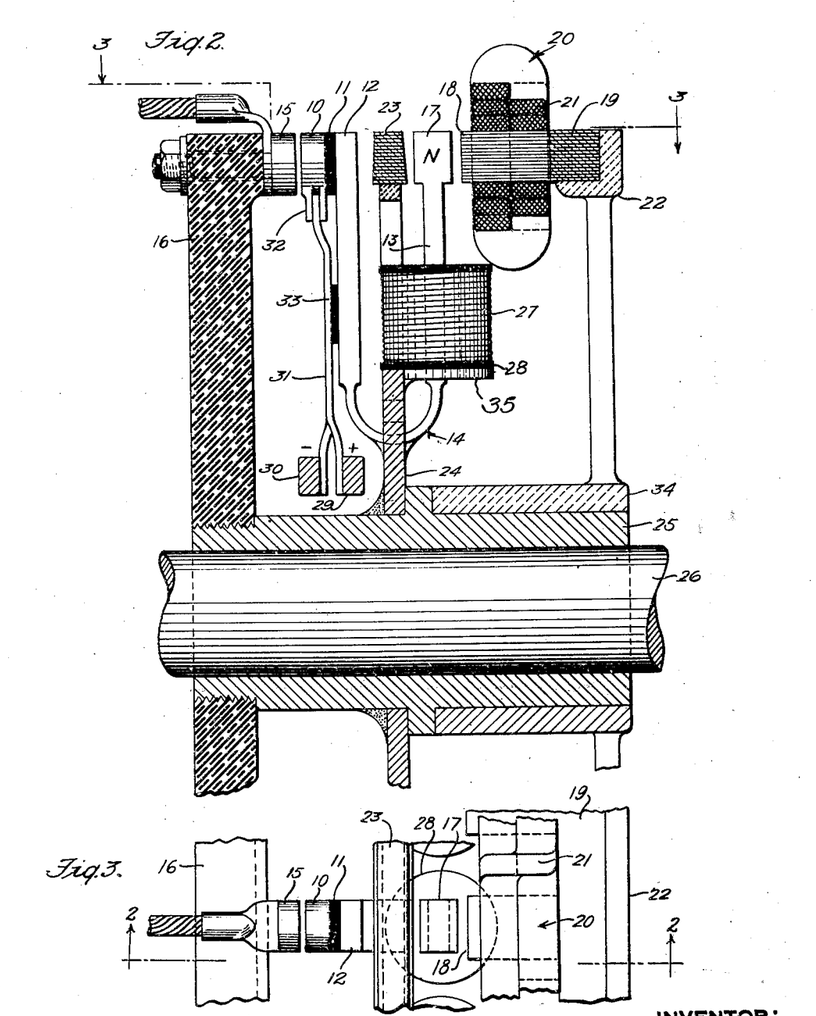
Figure 2 represents a sectional elevation of a single commutative unit comprising a tuning fork with the contacting, control and polarizing units, taken along 2—2 of Figure 3.
Figure 3 represents a plan view of the unit of Figure 2, with a section taken through coil 20 along line 3—3 in Figure 2.

Referring in detail to the device shown in Figures 1, 2, 3 and 4, it will be seen that a line contactor 10 is mounted upon the insulating block 11 on one arm 12 of the steel tuning fork 14, and the stationary armature contactor 15, is fixed to the insulating support block 16. Integral with the other prong 13 of the tuning fork 14 there is a small head 17 which is attracted and repelled by the nearby laminated transformer-steel core or tooth 18 of the multi-toothed, multi-coiled control electromagnet shown, having a polyphase, polar winding 20 of which single coil elements 21 are indicated in Figures 2 and 3. The coil and core are shown mounted on a brass support 22. The periodic attraction and repulsion of the one prong 13 causes synchronous vibration of both arms 12 and 13 in the same time-phase, in terms of inward and outward motion.

Between the arms 12 and 13 of the forks 14, there is a yoke-ring 23 forming a full circular annulus of laminated steel spaced near the heads of the prongs 12 and 13 on the sides thereof away from the teeth 18. Behind and integral with the multiple teeth 18 is an annular yoke-ring 19, also of laminated steel. These two yoke-rings complete the magnetic circuits for the aforementioned polyphase, polar electromagnet windings of the control system, via the prong-heads, adjacent air-gaps and multiple core-teeth. These magnetic paths of the control system are of substantially constant reluctance because the sums of the lengths of the air-gaps traversed do not change with the displacements of the prong-heads.

Co-operative and partly coincident with the foregoing paths of the control magnetism through the prong-head, air-gaps and yoke-rings, the paths of the polarizing fluxes are completed by the steel flange 24, upon which the forks 14 are supported, and with which they may be integral or integrally joined as by welding. To this flange 24 may be joined the centrally-bored collar 25, for mounting upon a suitable supporting member such as a shaft 26. Obviously the unit may be constructed with the vibrating elements arranged in a straight line or in any other arrangement, instead of circularly, as convenience and circumstance may indicate. The polarizing winding consists of the insulated coils 27 slipped over the magnetically actuated prongs 13 of the forks 14 and supported clear thereof, as by the insulating body 28 mounted upon the flange 35. The polarizing coils 27 may be series-connected, and must be so wound or joined that the free ends of adjacent cores or prongs 13 are polarized north and south, in alternate sequence, as heretofore explained. For reasons hereinafter explained, it is often desirable that the polarized prongs 13 have some magnetic retentivity.

The connections from the line contactors 10 and 10' are connected to the positive and negative bus rings 29 and 30 respectively by means of the flexible metal straps 31 and 31' respectively. These straps 31 and 31' may be joined to contactors 10 and 10' by means of bifurcated soldered terminals 32, and they may be prevented from whipping against the sides of the grounded fork 14 by means of the insulating pads 33. The straps 31 and 31' should be very pliable and should have a natural periodicity such as will not interfere with its free movement in harmony with the vibration of the prong 12. It will be observed that in the form of apparatus shown the flexing of these straps 31 and 31' is arranged to occur near the apex of vibration of the fork arm 12 so that the flexure may be at a minimum. For heavy currents, the use of these straps may be objectionable, because of their extra loading of the vibrators 12 and the likelihood of their finally breaking off from vibratory fatigue. Instead of either of these constructions, therefore, I may mount upon and insulate from each vibrator 12 a contactor wide enough and disposed periodically to bridge laterally and directly between two co-planar stationary contactors, the one connected to a tap-point of the armature and the other to one of the line mains in proper sequence as aforesaid.

The winding 21 of the control electromagnet 20 has the same number of poles as those of the generator, motor, converter or transformer served by the commutator; and it may either have the same number of phases as the number of concentrated or distributed coils per pole in the armature, or it may be connected as any polyphase winding, such as the common 3-phase connection. It may either be properly tapped to the armature to produce the aforementioned synchronously rotating field, or it may be electromagnetically linked with the armature through a pilot winding in the slots of the latter.

It is particularly important that while the field of the control winding rotates synchronously with that of the armature its time-phase must be approximately at right angles to that of the armature coil electromotive force in order that commutative contact shall occur at the right periods. For adjustment of this approximate relation and in order also, where desired, to regulate the output D. C. voltage of a converter or transformer, the control electromagnet 20 may be mounted upon an angularly movable collar 34 here shown of brass, slipped over the collar 25. When thus employing angular movement of the control electromagnet, it should be shifted relatively to the vibrators and their contactors in definite steps equal to the angular spacing of the vibrators, for the obvious reason that the teeth 18 of the electromagnet 20 should always align with the vibrators 17.

Figure 4:
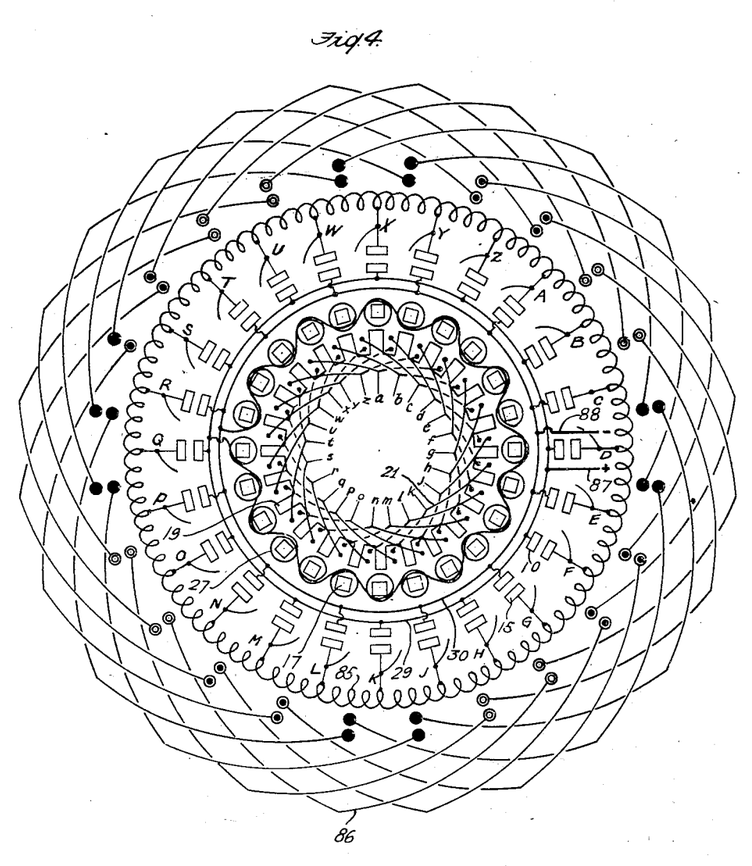
Figure 4 is a diagrammatic representation of the electrical connections for the commutating system shown in Figure 1, in relation to the armature (85) which it serves, and shows the relationship of this armature to the 3-phase, 4-pole other winding (86) of a converter between alternating and direct currents.

This time-phase relationship of the field of the control winding to that of the armature may be seen by referring to the wiring diagram, Figure 4. Therein are represented the control winding 21, the armature 85, and the winding 86 in inductive relationship to the armature, as well as the bus rings 29 and 30, the magnetically active prong heads 17, the polarizing coils 27, the stationary contactors 15 and the vibratory contactors 10. The control winding is shown in the slots of the core 19. Leads 87 and 88 are shown from the bus rings 29 and 30 to the mains. The leads to the winding 86 are omitted for simplicity, as they are connected in the usual way. The winding 86 as shown here is that for a 4-pole 3-phase machine.

The control winding 21 is connected to the armature 85 in the manner shown; the leads have been curtailed for the sake of clarity, and letters inserted to show the order of connection. Tap point A of the armature is connected to tap point a of the control winding, tap point B to tap point b, and so on. It will be seen from the diagram that the control winding 21 is so connected that it is 90 electrical degrees or 45 mechanical degrees away from the armature 85, in order to give the proper time-phase relationship, as discussed above.

The connections of the polarizing coils 27 may also be seen from Figure 4: adjacent coils are connected so that adjacent prongs are polarized to an opposite polarity. The polarizing circuit is energized as shown by connection to the direct current source in the bus rings 29 and 30.

Alternatively to the foregoing shifting of the control electromagnet 20 relatively to the vibrators 17, commutative phase adjustment may be effected by means included in this invention when applied to converters or transformers having their primary and secondary windings mutually separated on relatively rotatable structures; in that angular adjustment between these two windings will give such commutative phase regulation. The degree of such adjustment may be by infinitesimal steps, as with a worm-and-wheel setting of the transformer's rotatable member; and its purpose may include for example commutative spark prevention, output voltage regulation through a reasonable range, and/or variation of leakage reactance for altering the output current-voltage characteristic.

When my commutative system is employed with generators, converters and transformers, it is convenient to have the vibratory members of steel possessing some magnetic retentivity. This will provide polarization of said members, when starting a machine in operation, before the excitation of the polarizing winding has been built up by commutated output current from the machine. Due to carry-over of the direction of polarization from the previous run, it will also cause the machine's output voltage to be always in the same direction.

When my improved commutating apparatus is used as a part of the aforementioned converters and transformers having primary and secondary windings relatively movable, and particularly in those machines wherein leakage reactance is large enough to be exploited by variation, the design must be so computed and executed as to deal with the rather large self inductance of leakage of each coil as it passes through commutation. Where such phase adjustment and/or leakage variation are not desired, however, and particularly where high commutative voltages per coil must be met, the transformer structure preferably should be close-coupled, in order to minimize flux leakage. That is to say, the primary and secondary windings should be both wound into the same slots in the laminated transformer steel core. The two windings should be sub-divided and mutually interleaved, and there shall be no air-gaps in their mutual magnetic paths. Such close-coupled electromagnetic structure need not be circular, but obviously could be built in rectangular form as a polyphase transformer of a large number of phases.

In a converter thus close-coupled, each coil short-circuited as it goes under commutation will not have a large charge of inductively stored energy with no place to go other than into commutative contact heating. Since this coil has little flux leakage, its self inductance is low; and inasmuch as it is closely linked with the other (usually primary) winding, such stored energy as it does possess is readily discharged into the primary circuit. A coil passing beyond the mid point of commutation and therefore in the position requiring the rebuilding of stored energy, may likewise receive such energy by induction from the primary circuit and, in fact, may be so timed as to receive that part which is being discharged into the primary system from another coil entering short-circuit. This form of dynamic commutation is made possible in my invention through the facility with which self inductance may be thus minimized.

Where resistance commutation is not required, as in the foregoing, the stationary and vibrating contactors of my commutative apparatus may be made of suitable metal. Where low resistance is required for aiding commutation, they may be made of graphite or metal-graphite mixture; and where high resistance is required, as for example in machines built for exploiting leakage reactance, carbon contactors may be employed.

It will of course be understood that contact between an individual line contactor and its armature contactor persists at least until after contact has begun between the next line contactor and its armature contactor in the described sequence. This is obvious from the above reference to the condition of temporary short-circuit of an armature coil.

In some cases, as in large machines, it may be found desirable to utilize both arms of each fork for both of their aforementioned functions. That is to say, each arm may carry a contactor and also be acted upon by a tooth of a control electromagnet and by the polarizing system. The relations of the control and polarizing systems should still be such that both arms are urged outwardly at the same time and inwardly at the other part of the cycle. For example, the polarizing coils would be duplicated on the left as shown on the right (forming a consequent pole at the base of the U), the control structure would be duplicated and connected in exactly parallel phase, but placed radially lower in order to leave room for the contactors at the fork ends, and the contactors would be connected parallel with their corresponding duplicates in a plane.

Figure 5:
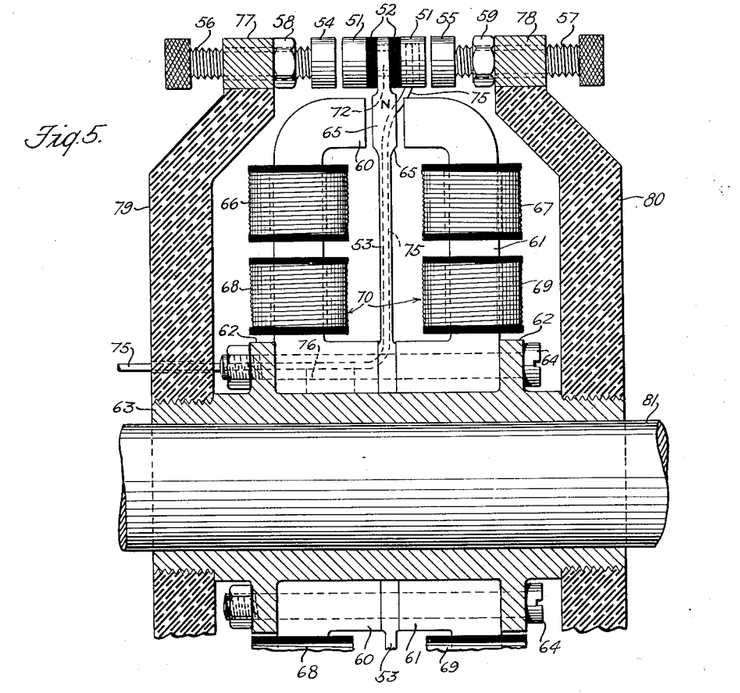
Figure 5 is a sectional elevation of a single unit of a commutating apparatus in which a reed is used instead of a tuning fork.
Figure 6:
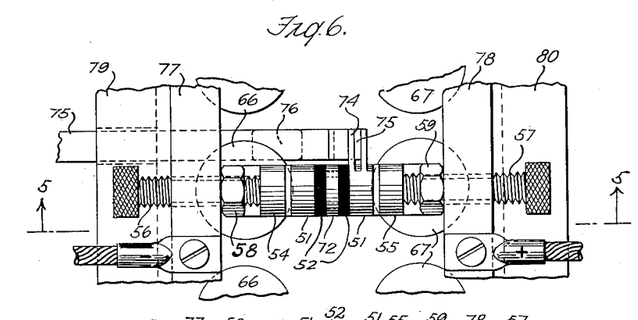
Figure 6 is a plan view of the unit shown in Figure 5.
Figure 7:
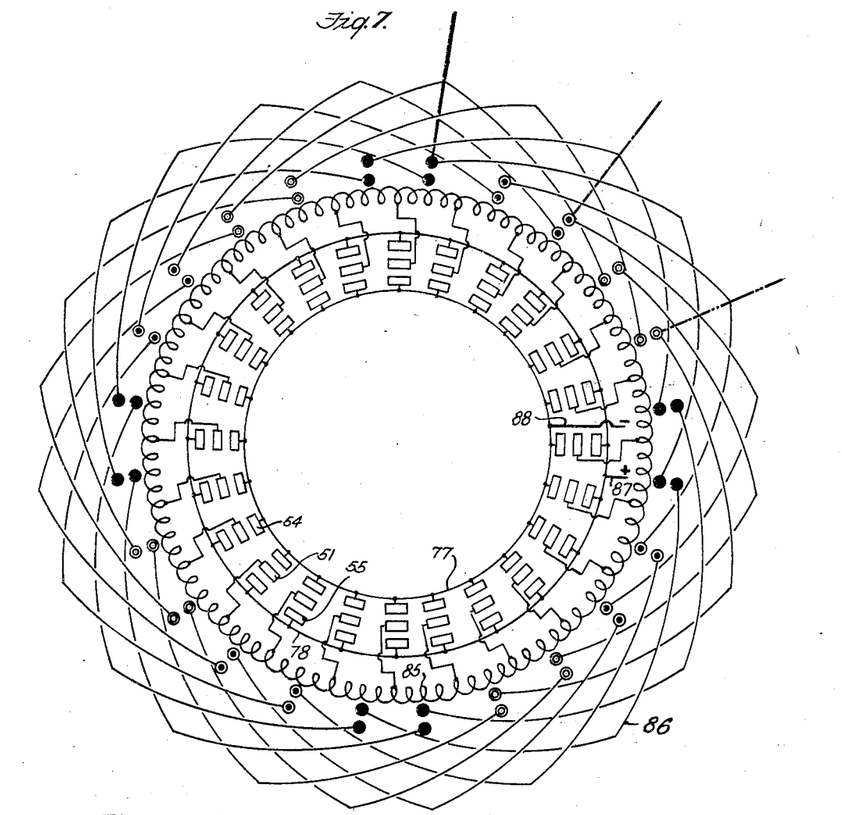
Figure 7 is a diagram showing the electrical connections between the elements of Figures 5 and 6 and the armature (85) served thereby, and of the linkage of the armature to the 3-phase, 4-pole other winding (86) of a converter.

In another embodiment of my invention, shown in Figures 5, 6 and 7, the tuning forks are replaced by single vibrating arms or reeds; the contactor 51 mounted upon each reed 53 is double-faced, and co-acts with stationary contactors 54 and 55 spaced near its left and right sides. The armature contactors are preferably the double-faced, reed-mounted ones 51, and are connected to the armature sequentially in the same manner as in the first-described embodiment. Of the stationary contactors, the right-hand ones 55 are preferably all connected to one of the line mains and the left-hand ones 54 are all connected to the other main. In this form the polarization of all the reeds 53 is in the same direction (e. g., all of the free ends are north poles); and in operation a commutating zone does not have the feature of alternately active and inactive contactors in spatial sequence, present in my other embodiment.

Referring in detail to Figures 5, 6 and 7, the armature contactor 51 is mounted upon insulating bushing 52, in turn supported upon the vibratory reed 53. The moving armature contactor 51 is double-faced and makes contact alternately with the negative and positive line contactors 54 and 55, spaced at the left and right of the armature contactors 51 at such distance that the latter presses upon its line contactors 54 and 55 for a short period at the end of each lateral deflection. The length of time of such contact may be adjusted by means of the screws 56 and 57 and locknuts 58 and 59, with which the position of the contactors 54 and 55 relative to their insulated bus rings 77 and 78 may be determined.

The vibratory reed 53 is tightly clamped between two yokes 60 and 61 of laminated transformer steel, which are in turn pressed into the space between two flanges 62 on the collar 63, and positioned and held by the machine bolts 64 passing through the holes in the flanges 62, yokes 60 and 61, and reeds 53. As in the case of the tuning fork commutator, this assembly may either be arranged circularly around the collar 63 and bored for mounting upon a shaft 81, forming a part of the general apparatus, or it may be arranged straightaway by changing the collar 63 into a flat base, or in any other desired arrangement. The yokes 60 and 61 are so formed that their top ends are closely juxtaposed to the draw-body 65 which forms an integral part with the reed 53 a short distance below the mounting of the armature contactors 51. Thus, an air-gap is left on each side of the draw-body 65. Its depth should be such that when the reed 53 is deflected right or left sufficiently to bring the armature contactors 51 against the line contactors 54 or 55, the draw-body 65 will not quite touch the polar ends of the yokes 60 and 61.

Upon the vertical arms of the yokes 60 and 61 are wound coils 66 and 67, connected in the control winding 71 in such direction that when at any instant the magnetomotive force induced by the control current in the left-hand coil 66 is upward, that induced in the right-hand coil 67 is downward. The control-flux path therefore is continuous, starting at one air-gap, passing through a yoke, through the common junction of the yokes and reed 53 at the bottom, through the other yoke and thence to the second air-gap and draw-body 65.

Polarization of each reed 53 and its pair of yokes 60 and 61 is induced by windings which may consist of individual coils 68 and 69 around each yoke, forming a complete winding designated 70. The magnetomotive forces of the polarizing coils should be directed either all outwardly or all inwardly so that their opposition may form a consequent pole at the base of the reed 53. Thus, the direction of the polarizing flux starting at the base of a reed 53, will be upward along the reed 53 to the draw-body 65, there divided right and left into the two yokes 60 and 61, and back to the base of the reed 53 in opposite angular directions. With variation of magnitude and direction of current in the control coils 66 and 67, the polarized draw-body 65 will move synchronously right and left, while the reluctance of both the control-flux path and the polarizing-flux path will remain substantially unchanging. Preferably, the reed 65 should be of steel having some magnetic retentivity, for reasons explained hereinbefore.

The right and left armature contactors 51 are interconnected by the stud 72 passing through the insulating bushing 52, and are connected to a tap point of the armature winding by means of the solder clips 74 and flexible conductive strap 75 in a plane lateral to the vibratory reed 53. The lower end of the flexible strap 75 is anchored upon insulating block 76 and is carried thence to suitable tap points of the armature. These tap points are the usual consecutive points of connection to the armature. In this form of my apparatus the line contactors 54 and 55 are not in one plane with alternate positive and negative connection to the external lines as is the case in the tuning-fork form, but are in two planes, with those 55 at the right of the armature contactors 51 all connected to say the positive main, and those 54 of the left all connected to the negative main.

The adjusting screws 56 and 57 with their locknuts 58 and 59 are mounted in the metal rings 77 and 78, in turn supported upon the left and right insulating plates 79 and 80. In these illustrations of the vibratory-reed form of my invention, relative movement between the control system and the armature contactors 51 has not been shown, since in some cases it is not wanted. Obviously, however, such adjustments could be provided by suitable mechanical design, as in the case of the tuning-fork form.

Figure 8:
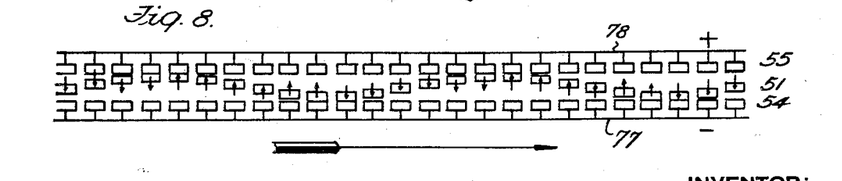
Fig. 8 is a development of the commutating system of Fig. 7, showing the position at a given instant of all of the moving contactors, and their relation to the fixed contactors.

The method of operation of the commutating system will be apparent from the schematic view or development diagram, Fig. 8, in which the arrow indicates the direction of travel of the waves of contact between the moving contactors 51 and the fixed contactors 54 and 55.

In the connection diagram, Figure 7, it will be observed that the relations described above are consistently carried out. That is to say, the armature contactors 51 are consecutively connected to the tap points of the armature winding 85. The control circuits and polarizing coils have been omitted from Figure 7 for the sake of clarity, inasmuch as even a conventional representation would be more hindrance than help in following the connections and since in principle they are identical with those shown simply and clearly in Figure 4, and in arrangement they will be understood from the foregoing description. The control circuit is connected in such wise as to produce the effect of a progressively moving magnetic vibration-exciting flux moving from one reed to the next in fixed relation to the rotating magnetic field of the primary of the machine served, in the manner hereinbefore described.

My invention therefore broadly comprises a novel method of electric commutation wherein the commutation is effected either entirely or in part by sequential conductive contacting, actuated and timed by mechanically vibrating members, said members being preferably tuned to a natural frequency of vibration which is close to the frequency of the alternating current to be commutated. In turn, the vibration of said members is excited and induced by magnetic means, and the frequency, time-phase and amplitude thereof for each member are regulated by alternating currents in a system of control circuits comprising electromagnets for the said exciting magnetism, and coordinated sources of the said regulating alternating currents. The connection-changing function of commutation in all embodiments of my invention is performed by the vibrating members and the coordinated control system. The coil-energy unloading and restoring function may be performed by the vibrator system, when resistance commutation is used, or by a separate and coordinated electrical system when dynamic commutation is employed.

My invention thus not only aims to overcome in a new commutative device the disadvantageous characteristics of existing methods and devices; but also has for its objects other improvements, which include: the adaptation of direct-current apparatus generally to high voltage; the elimination of rotating commutator structures, with consequent reduction of wear and frictional power losses; the adaptation of converters and direct-current transformers to construction without rotating armatures; the adaptation of these devices to constructions in which the commutative parts either are juxtaposed to the armature served, for the sake of compactness or exposure to the same ambient, or are separated therefrom to any desired extent for separate cooling, convenient support, wiring, insulation or maintenance, or for enclosure in a different medium than that of the armature, for a purpose such as spark quenching; the control, remote from the inductive structures, of the commutative time phase, for minimizing contact sparking or regulating output voltage; the adaptation of the commutator to inter-connection and operation with auxiliary electric means for effecting dynamic commutation; and the exploitation, for resistance commutation, of the variation of contact resistance of carbon contactors with pressure change.

My improved commutative method and apparatus may be employed with and as a part of electric generators, motors, converters of alternating currents to direct currents or of direct current to alternating currents, or transformers of direct currents from one to another circuit at the same or different voltage. In such converters or transformers, the power-input circuit may be either separate and insulated from the power-output circuits, or wholly identical as in rotary synchronous converters, or partly identical as in auto-transformers.

One adaptation of my device is that to the production of direct current of high voltage. If the bus rings of the commutator structure are sectionalized so that each section collects the current from the commutative elements serving one winding section of at least one pair of poles of the alternating current machine served, and if each of such winding sections be closed upon itself but insulated from the other sections, the separate bus ring sections may be connected in such wise as to yield direct current at a voltage which is equal to the sum of the individual voltages in the bus ring sections. This adaptation of a commutative device to the production of high voltage is unique with my device, since it is obviously impossible to adapt the conventional rotating commutator to this use. The illustrated embodiments of my invention include stationary armature windings and thus develop the invention to best advantage as the commutating system, as a whole, is stationary. It will be apparent, however, that the commutating system may be applied to the rotating armature type of electrical apparatus by rotating the entire system with the armature and employing slip-rings and brushes for establishing contact with the relatively fixed contacts.

It will be obvious to those conversant with the art that many adaptations of my apparatus can be made within the scope of my invention as disclosed herein, and that many equivalents and variations may exist. For example, while the vibrating members may be tuned close to the frequency of the alternating current, the term "close to" includes of course identical with. In some cases it may be more convenient to construct the moving parts suitably for response by forced vibration. For example, in converting from 25-cycle supply current to direct current, the moving parts may be given a lighter construction than would be necessary to impart to them a natural frequency of this magnitude; so that they may thus respond at 25 cycles by forced vibration. Furthermore, many of the elements set forth as parts of the tuning-fork type of apparatus may be used as a part of the vibratory reed type, and vice versa. I wish therefore to be limited only by the prior art, and to the true scope of my invention as disclosed herein and defined by the appended claims.

I claim:

1. In a commutating device, two sets of contacting elements arranged in cooperating pairs, and means for actuating at least one element of each of said pairs of elements to make and break contact with the cooperating element of the pair; said means comprising tuned and magnetically polarized vibratory members, and electromagnetic means for controlling the vibration of said members.

2. A commutating structure containing no rotating mechanical parts, said structure comprising a series of pairs of contacting elements, mechanically tuned vibratory members for actuating at least one element of each of said pairs, means magnetically polarizing said members, and electromagnetic means for controlling the vibration of said members.

3. In electrical apparatus of the type including a polyphase primary winding adapted to develop a rotating magnetic field when supplied with alternating current, and a second winding, commutative apparatus connected to said second winding, said apparatus comprising a series of contacting devices each including a stationary contact and a movable contact, vibratory members supporting said movable contacts, and magnetic means including control circuits electrically connected to one of said windings for synchronously opening and closing said contact devices.

4. The invention as claimed in claim 3, wherein each of said vibratory members is mechanically tuned to vibrate at approximately the frequency of the alternating current to be supplied to said primary winding.

5. The invention as claimed in claim 3, wherein said magnetic means includes means magnetically polarizing said vibratory members.

6. The invention as claimed in claim 3, wherein each of said vibratory members comprises a tuning fork; said magnetic means includes a polarizing winding surrounding one leg of each fork and an actuating winding adjacent a leg of each fork; and the said control circuits connecting the respective actuating windings to points in one of said windings which progressively energize the control windings in predetermined relation to the rotating magnetic field of the primary winding.

7. The invention as claimed in claim 3, wherein each of said vibratory members comprises a vibrating reed tuned to a natural frequency of vibration close to the frequency of the alternating current supply for said primary winding; and said electromagnetic means comprises a yoke for each reed, each yoke having its free ends at opposite sides of the free end of the associated reed, means for polarizing said reeds magnetically, and a control winding on each yoke; said control windings being connected to the secondary winding by said control circuits to progressively energize said control windings in predetermined relation to the rotating field established by said primary winding.

8. Commutative apparatus for use with a winding positioned in a rotating magnetic field, said apparatus comprising a series of stationary contacts adapted to be connected to direct current bus bars, a vibratory member adjacent each of said contacts, a contact on each of said members, and a control winding adjacent each of said members and adapted to be connected to said winding.

9. Commutative apparatus as claimed in claim 8, wherein each of said vibratory members is mechanically tuned, in combination with means magnetically polarizing each vibratory member.

10. Commutative apparatus as claimed in claim 8, wherein each of said vibratory members comprises a tuning fork, and said control windings are located adjacent one leg of the said tuning forks.

11. Commutative apparatus as claimed in claim 8, wherein each of said vibratory members comprises a tuned reed, in combination with a yoke for each reed and having its ends at opposite sides of the free end of its associated reed, and wherein said control windings are located on said yokes.

12. Commutative apparatus comprising cooperating pairs of relatively stationary and movable contacts, mechanically tuned vibratory members carrying said movable contacts, and magnetic means adapted to be energized by polyphase alternating current for controlling the vibration of said vibratory members.

13. Commutative apparatus as claimed in claim 12, in combination with means magnetically polarizing each of said vibratory members.

14. A commutative structure for use with a winding subjected to the influence of a rotating field, said structure comprising a plurality of groups of pairs of contacts, at least one pair of contacts in each group being adapted to serve as the commutative contacting means for one pole of the rotating field and each group including at least two pairs of contacts, tuned vibratory means for actuating at least one contact of each pair, electromagnetic means for controlling the vibration of said members, output terminals and circuit connections between said groups and output terminals to develop at said terminals a direct current output voltage equal to the sum of the voltages developed at the individual groups of said pairs of contacts.

15. A commutating device as claimed in claim 1, wherein at least one element of each of said pairs comprises a material which has a progressively decreasing electrical resistance with increasing pressure thereon.

16. Commutative apparatus comprising two series of relatively stationary contacts arranged in pairs, a series of relatively movable contacts cooperating with the respective pairs of relatively stationary contacts, mechanically tuned vibratory members carrying respectively the several relatively movable contacts, and magnetic means for controlling the vibration of said vibratory members.

17. Commutative apparatus as claimed in claim 16, in combination with means magnetically polarizing each of said vibratory members.

18. Commutative apparatus as claimed in claim 16, wherein the respective series of relatively stationary contacts are connected to leads of positive and negative polarity, in combination with means for magnetically polarizing the several vibratory members whch carry the series of relatively movable contacts.

19. Commutative apparatus comprising a series of cooperating pairs of relatively stationary and movable contacts, mechanically tuned vibratory members carrying said movable contacts, means magnetically polarizing each two adjacent vibratory members in opposite senses, electric terminals of opposite polarity connected alternately to the series of stationary contacts, and magnetic means adapted to be energized by polyphase alternating current for controlling the vibration of said vibratory members.

GEORGE T. SOUTHGATE.